(12) United States Patent
Meng et al.

(10) Patent No.: US 7,374,740 B2
(45) Date of Patent: May 20, 2008

(54) PROCESS FOR PRODUCING HIGH PURITY PHOSPHATES

(75) Inventors: Xiangsheng Meng, Chanhassen, MN (US); Paris Tsobanakis, Inver Grove Heights, MN (US); Alan Peacock, Minnetonka, MN (US); Don Clark, Tampa, FL (US); Colin Weyrauch, Brandon, FL (US)

(73) Assignee: Cargill, Incorporated, Wayzata, MN (US)

( * ) Notice: Subject to any disclaimer, the term of this patent is extended or adjusted under 35 U.S.C. 154(b) by 273 days.

(21) Appl. No.: 11/094,518

(22) Filed: Mar. 31, 2005

(65) Prior Publication Data

US 2006/0222581 A1 Oct. 5, 2006

(51) Int. Cl.
C01B 25/28 (2006.01)
C01B 25/30 (2006.01)
C01B 25/32 (2006.01)

(52) U.S. Cl. .................. 423/308; 423/157.3; 423/309; 423/312

(58) Field of Classification Search ................ 423/308, 423/309, 312, 157.3
See application file for complete search history.

(56) References Cited

U.S. PATENT DOCUMENTS 4,160,657 A * 7/1979 Drechsel ..................... 71/41
4,678,649 A * 7/1987 Alexander et al. .......... 423/308
4,704,263 A * 11/1987 Berry et al. ................ 423/312
4,885,148 A * 12/1989 Erickson et al. ............ 423/309

FOREIGN PATENT DOCUMENTS

EP 0488736 * 6/1992

OTHER PUBLICATIONS

Joseph A. Babor, Basic College Chemistry (1947), Thomas Y. Crowell Company, p. 298, no month.*
C. A. Jacobson, Encyclopedia of Chemical Reactions (1948), Reinhold Publishing Company, pp. 118, 119, no month.*

* cited by examiner

Primary Examiner—Wayne A. Langel

(57) ABSTRACT

Phosphate rock is reacted with phosphoric acid to produce monobasic calcium phosphate. Monobasic calcium phosphate is reacted with ammonium carbonate to produce ammonium phosphate. Dibasic calcium phosphate is also produced as a by-product when monobasic calcium phosphate reacting with ammonium carbonate. The dibasic calcium phosphate is reacted with sulfuric acid to produce phosphoric acid. The phosphoric acid is used to react with phosphate rock. Ammonium sulfate or ammonium hydroxide may be used instead of ammonium carbonate. Phosphate other than ammonium phosphate can be produced if calcium phosphate is reacted with x-y to produce x-phosphate, where x is lithium, sodium, ammonium or potassium and y is carbonate, bicarbonate hydroxide or sulfate.

13 Claims, 1 Drawing Sheet

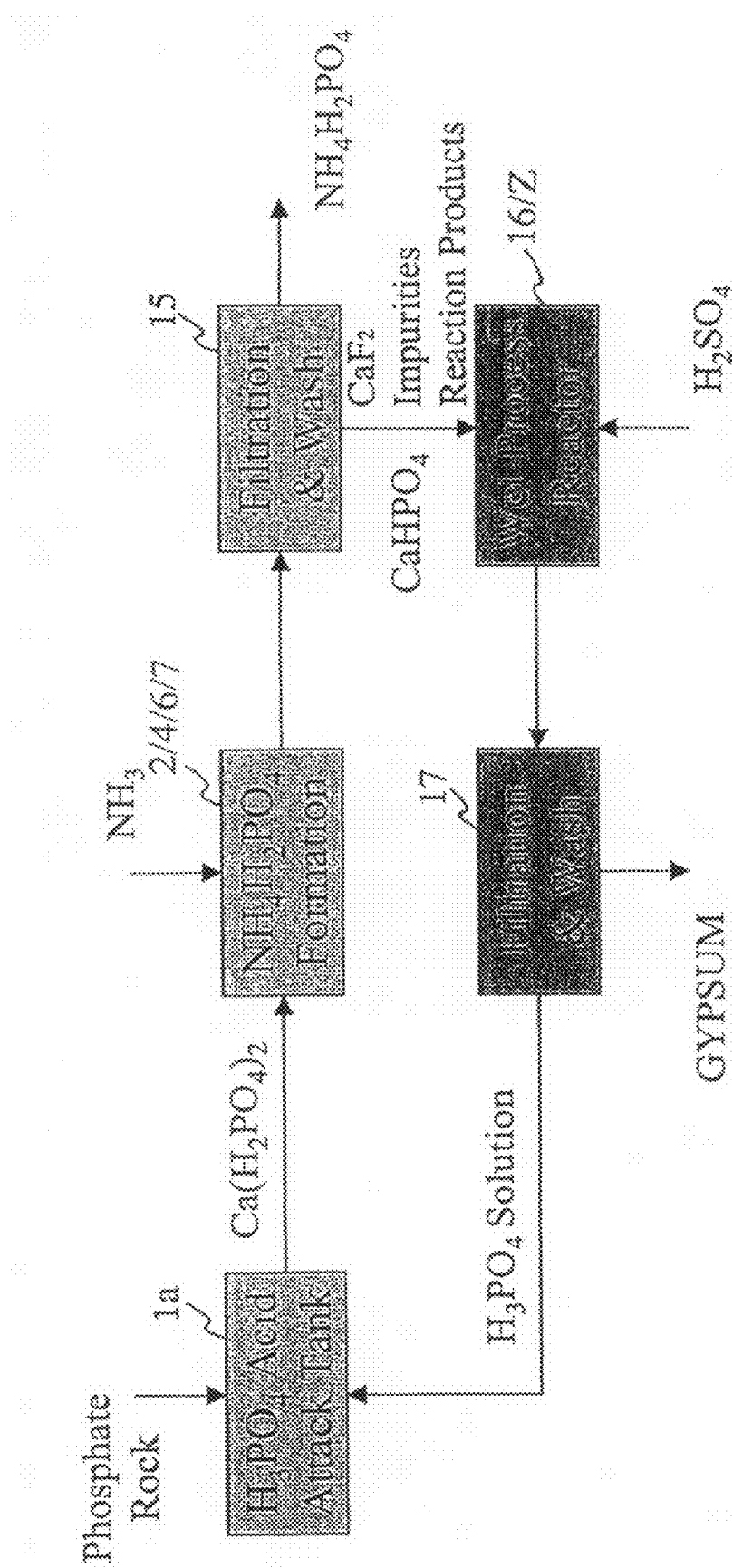

PROCESS FOR PRODUCING HIGH PURITY PHOSPHATES

BACKGROUND OF THE INVENTION

Presently, phosphoric acid is produced by the wet process in which sulfuric acid is used to treat a fine phosphate rock as shown in the following reaction.

$$Ca_5F(PO_4)_3 + 5H_2SO_4 + H_2O \rightarrow 5CaSO_4 \cdot 2H_2O\downarrow + 3H_3PO_4 + HF \quad (1)$$

In this process dihydrated calcium sulfate (also called gypsum or phosphogypsum) is produced as a waste. From Reaction 1, it can be seen that every three moles of phosphoric acid production requires 5 moles of sulfuric acid. A ratio of sulfuric acid to phosphoric acid is 5/3.

The phosphate rock also contains several impurities, such as such as Mg, Al, Si, Fe, Mg, Zn, Mn, Cr, Na K and other metals. These impurities consume sulfuric acid. By considering the acid consumption by these impurities, the ratio of sulfuric acid to phosphoric acid can be 2 or higher.

Reaction 1 shows the reaction between phosphate rock and sulfuric acid. However, even if phosphate rock is very well ground, only the outside surface of the phosphate rock reacts with sulfuric acid. This "surface only" reaction can be attributed to a rapid reaction between sulfuric acid and phosphate rock forming a gypsum film or layer on the surface of the phosphate rock. The inside of the phosphate rock particles remains un-reacted causing an increase in the quantity of gypsum waste as well as causing a reduction in the amount of phosphate recovered.

To address this issue, Reaction 1 is performed as two separate reactions, Reactions 1a and 1b as shown below.

$$2Ca_5F(PO_4)_3 + 12H_3PO_4 \rightarrow 9\ Ca(H_2PO_4)_2 + CaF_2 \quad (1a)$$

$$9Ca(H_2PO_4)_2 + CaF_2 + 10H_2SO_4 + 20H_2O \rightarrow 18H_3PO_4 + 2HF + 10CaSO_4 \cdot 2H_2O\downarrow \quad (1b)$$

In Reaction 1a, the phosphate rock is first reacted with phosphoric acid to produce monobasic calcium phosphate (monocal) slurry. Then, in Reaction 1b, the monobasic calcium phosphate slurry is reacted with sulfuric acid to produce phosphoric acid and calcium sulfate dihydrate (gypsum). Filtration is used to separate gypsum.

The phosphoric acid required in Reaction 1a is obtained from the recycling of phosphoric acid in the plant. From Reactions 1a and 1b, it can be seen that 12 moles of 18 moles of phosphoric acid produced is recycled or 67% of total phosphoric acid produced needs to be recycled. The remaining 33% of the phosphoric acid can be used to produce ammonium phosphate and other phosphate products. For example, monoammonium phosphate (or MAP) may be produced by reacting ammonia with phosphoric acid according to reaction Q.

$$NH_3 + H_3PO_4 => (NH_4)H_2PO_4 \quad (Q)$$

The reaction condition in Reaction 1 is very acidic due to the addition of sulfuric acid, which causes all the impurities in the phosphate rock to be leached out into solution. The phosphoric acid in solution is therefore impure and has a dark brown color. This impure phosphoric acid is currently used to produce ammonium phosphate fertilizer by reacting ammonia with the impure phosphoric acid (reaction Q). Therefore, the resulting fertilizer grade ammonium phosphate is of low purity. However, as the resulting ammonium phosphate is used as fertilizer, purity of is not of major consequence.

SUMMARY OF THE INVENTION

Accordingly, it is one possible object to provide an economic process for producing industrial or technical grade ammonium phosphate from phosphate rock.

It is another possible object to provide a process where fluorine and other impurities in the phosphate rock can be rejected simultaneously during the production of the ammonium phosphate.

It is a further potential object to provide a method for using a low-grade phosphate rock to produce ammonium and calcium phosphates or other phosphates that meet higher quality specifications.

Other and/or different features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

The FIG. is a flowchart showing a continuous process of reacting phosphate rock with phosphoric acid to produce high purity ammonium phosphate.

DETAILED DESCRIPTION OF THE INVENTION

Reference will now be made in detail to the preferred embodiments of the present invention, examples of which are illustrated in the accompanying drawings, wherein like reference numerals refer to like elements throughout.

Referring to reaction 1, the impurities in phosphate rock such as heavy metals including Fe, Mg, Co, Al, Ca, etc. upon reacting with sulfuric acid in reaction 1 become soluble or insoluble salts. The soluble salts such as magnesium, iron and aluminum sulfates remain in solution and the insoluble salt (primarily calcium sulfate dihydrate (gypsum)) precipitate.

If ammonium phosphate or other phosphates can be produced directly from monobasic calcium phosphate slurry produced in Reaction 1a, then reaction Q will not be needed. Therefore, Reaction 1b will not be needed to produce phosphoric acid for reaction Q. However, if the source of phosphoric acid in 1a is produced from Reaction 1b, then reaction 1b cannot be eliminated.

It has been demonstrated in the lab that the monobasic calcium phosphate (monocal) produced in reaction 1a can be reacted with ammonium carbonate to produce monobasic ammonium phosphate (MAP) at room temperature (Reaction 2).

Ammonium carbonate is a mixture of ammonium hydroxide with $CO_2$ and can be produced easily by bubbling carbon dioxide gas into ammonium hydroxide solution. At ambient temperature and pressure, ammonia reacts with water and converts to ammonium hydroxide according to Reaction x1 below.

$$NH_3(g) + H_2O(l) <=> NH_4OH(aq) \quad (x1)$$

In addition, if both water and carbon dioxide are in the presence of ammonia, then ammonium carbonate or ammonium bicarbonate are formed respectively according to Reactions x2 or x3 below.

$$2NH_3(g)+H_2O(l)+CO_2(g)\Leftrightarrow(NH_4)_2CO_3(aq) \quad (x2)$$

$$NH_3(g)+H_2O(l)+CO_2(g)\Leftrightarrow(NH_4)HCO_3(aq) \quad (x3)$$

When excess carbon dioxide is bubbled into ammonium hydroxide then ammonium bicarbonate is formed (Reaction x3). When a smaller amount of carbon dioxide is bubbled into ammonium hydroxide then ammonium carbonate is formed (Reaction x2).

Mono ammonium phosphate (MAP) is produced according to Reaction 2 below.

$$Ca(H_2PO_4)_2+(NH_4)_2CO_3 \rightarrow 2NH_4H_2PO_4+CaCO_3\downarrow \quad (2)$$

A driving force for Reaction 2 is a lower solubility (about 15 ppm) of calcium carbonate, $CaCO_3$, than that (1.8%) of monobasic calcium phosphate. If a lower water-soluble dibasic calcium phosphate, $CaHPO_4$, (about 400 ppm) is used instead of monobasic calcium phosphate in Reaction 2, about 33% conversion to ammonium phosphate is reached after 4 hours reaction time at 50° C. This conversion is less than the conversion from monobasic calcium phosphate.

Dibasic calcium phosphate is present because monobasic calcium phosphate has a tendency to form dibasic calcium phosphate and phosphoric acid when monobasic calcium phosphate is dissolved in water. See Reactions Y below.

$$Ca(H_2PO_4)_2(aq.) \rightarrow CaHPO_4+H_3PO_4 \quad (Y)$$

This disproportionate reaction is driven to the right by the lower solubility of dibasic calcium phosphate. The addition of phosphoric acid to the Reaction Y solution will drive reaction Y to the left.

Reaction Y lowers the yield of ammonium phosphate from monobasic calcium phosphate (reactions 2). Further, the acidity of monobasic calcium phosphate will also disassociate ammonium carbonate to ammonia and $CO_2$ (the reverse of reactions x2 and x3), which also reduces the formation of calcium carbonate and ammonium phosphate and encourages the calcium to be consumed in reaction Y.

To overcome these problems, ammonium sulfate can be used to react with monobasic calcium phosphate (monocal) to form ammonium phosphate as shown in Reaction 4. That is, the use of ammonium sulfate is an alternative to reactions 2.

If monobasic calcium phosphate is added in the presence of some phosphoric acid into ammonium sulfate solution, the yield of ammonium phosphate should improve significantly. The presence of phosphoric acid can prevent or reduce the disproportionation reaction of monobasic calcium phosphate to phosphoric acid and dibasic calcium phosphate. As shown in Reaction 5, ammonium sulfate can be produced by reacting calcium sulfate with ammonium carbonate. An overall reaction of Reactions 4 and 5 is Reaction 2.

$$Ca(H_2PO_4)_2+(NH4)_2SO_4 \rightarrow 2NH_4H_2PO_4+ CaSO_4 2H_2O\downarrow \quad (4)$$

$$CaSO_4 2H_2O+(NH_4)_2CO_3 \rightarrow (NH_4)_2SO_4+CaCO_3\downarrow \quad (5)$$

Monobasic calcium phosphate used in the Reactions 2 and 4 is made from phosphate rock (reaction 1a) with wet-process phosphoric acid and contains many impurities. Some impurities, such as Fe, Al, Mg, Ca, Mn, Zn, and Cr exist as phosphates. These phosphates and some dibasic calcium phosphate from the disproportionation reaction of monobasic calcium phosphate stay with the calcium carbonate solid phase in Reaction 2 or 4 and need to be recovered by recycling them.

The FIG. is a flowchart showing a continuous process of reacting phosphate rock with phosphoric acid to produce high purity ammonium phosphate. Referring to the FIG., phosphate rock is fed into the $H_3PO_4$ Acid Attack Tank (reactor 1a) where reaction 1a occurs. Any unreacted phosphate rock and phosphoric acid along with the products of reaction 1a, namely monocal and calcium fluoride are collectively referred to as superphosphate. This superphosphate exits the $H_3PO_4$ Acid Attack Tank and enters the $NH_4H_2PO_4$ Formation stage (reactor 2/4/6/7) where an ammonia source is introduced. The monocal in the superphosphate reacts with the ammonia source to form mono ammonium phosphate (MAP). The ammonia source may be ammonium carbonate (Reaction 2) or ammonium sulfate (Reaction 4). The ammonia source may also be ammonium hydroxide, as shown in Reactions 6 and 7. The other products of reactions 6 and 7 are dical, calcium hydroxide.

$$Ca(H_2PO_4)_2+NH_4OH \rightarrow NH_4H_2PO_4+CaHPO_4\downarrow+H_2 \quad (6)$$

$$Ca(H_2PO_4)_2+2NH_4OH \rightarrow 2NH_4H_2PO_4+Ca(OH)_2\downarrow \quad (7)$$

All unreacted reactants, impurities, and products exit the $NH_4H_2PO_4$ Formation stage 2/3/4/6/7 and enter the Filtration & Wash stage 15. MAP is in solution. In the Filtration & Wash stage, MAP is separated via filtration from the solid materials. The non-soluble impurities may also behave as filtration aids to enhance the filtration, to separate the ammonium phosphate solution from the precipitates. The desired product—MAP—can then be collected from solution via crystallization.

The remaining solids include dical, calcium fluoride, the other reaction products, which vary depending on which of reactions 2-7 are used. These remaining solids exit the Filtration & Wash stage 15 and enter the Wet-Process Reactor 1b/Z. Because we are using dibasic calcium phosphate instead of monobasic calcium phosphate, below reaction (Z) occurs instead of reaction (1b).

$$CaHPO_4+H_2SO_4+2H_2O \rightarrow H_3PO_4+CaSO_4 \cdot 2H_2O\downarrow \quad (Z)$$

Therefore, phosphoric acid is generated in the Wet-Process Reactor 1b/Z. The products of reactions 1b and Z exit the Wet-Process Reactor 1b/Z and enter a second Filtration & Wash stage 17. In the Filtration & Wash stage 17, solid gypsum is separated out via filtration. The remaining products are in liquid phase including, phosphoric acid and water. The phosphoric acid solution exits the Filtration & Wash stage and is recycled back to the $H_3PO_4$ Acid Attack Tank 1a to react with the incoming phosphate rock. Therefore, the process shown in the FIG. allows the production of MAP to run continuously. Because un-reacted phosphates are recycled back to phosphoric acid production, a high yield of ammonium phosphate from monocal is important, but not crucial.

The FIG. does not show any phosphoric acid being added to or removed from the system. It should be apparent that if excess ammonia is fed into reactor 2/4/6/7, most of the monobasic calcium phosphate would be converted into ammonium phosphate, and there will not be enough calcium phosphate remaining to produce the phosphoric acid required for Reaction 1a. Reaction 1a requires 12 moles of phosphoric acid to produce 9 moles of monobasic calcium phosphate. In order to supply the 12 moles of phosphoric acid for Reaction 1a, Reaction 1b must be run at ⅔ the molar amounts shown for the reaction. At ⅔ the molar amounts shown for Reaction 1b, 6 moles of monobasic calcium phosphate are required. Of the 9 moles of monobasic calcium phosphate produced in Reaction 1a, 6 moles can be supplied to the wet-process reactor 1b/Z, and 3 moles can be reacted with the ammonia source to produce ammonium phosphate. The ratios for the dibasic reaction Z can be similarly calculated.

In order to reduce the ammonium phosphate production, it is possible to simply decrease the amount of ammonia source fed into the system. Alternatively, it is possible to have a calcium phosphate bypass stream. This is steam would bypass the ammonium phosphate formation stage 2/4/6/7 and the Filtration & Wash stage 15.

To avoid adding phosphoric acid, the ammonium phosphate formation tank 2/4/6/7 should consume no more than three moles of monobasic calcium phosphate. It is also possible to reduce the ammonium phosphate production such that fewer than 3 moles of monobasic calcium phosphate are consumed by ammonium phosphate. The system shown in the FIG. produces relatively pure ammonium phosphate, perhaps technical grade ammonium phosphate. The demand for this type of ammonium phosphate may be significantly less than the demand for lower grade ammonium phosphate. If the production of ammonium phosphate is further reduced, then there is excess phosphoric acid, which can be used, for example, to produce lower grade ammonium phosphate. The excess phosphoric acid can be removed from the system between the Filtration & Wash stage 17 and the phosphoric acid Attack Tank 1a. Just as phosphoric acid may be removed, phosphoric acid may also be added if there is a great demand for high purity ammonium phosphate.

As mentioned above, ammonium hydroxide can be used instead of ammonium carbonate to produce ammonium phosphate from monobasic calcium phosphate as shown in Reactions 6 and 7. The maximum yield of ammonium phosphate from Reaction 6 is 50%. Despite the maximum yield of ammonium phosphate from Reaction 6 being 50%, a higher yield can be achieved. This is because reaction 7 occurs together with reaction 6. The average yield of the overall system is somewhere between 50% and 100%.

To understand the system of reactions 6 and 7, it is helpful to realize that three reactions are occurring simultaneously, reaction 6, reaction 7 and disproportionation reaction Y The solubility of dibasic calcium phosphate, a product of reaction Y, is about 400 ppm, which is lower than the about 1000 ppm solubility of calcium hydroxide, which is a product of reaction 7. This solubility difference indicates that reaction Y may be preferred over reaction 7. However, the solubilities are close enough that the preference for reaction 7 is not a strong preference.

The production of ammonium phosphate from Reactions 2, 4, 6 and 7 reduces impurities in ammonium phosphate dramatically.

The reduction in impurities is extremely important when a low-grade phosphate rock is used in the production of ammonium and calcium phosphates. As high-grade phosphate rock has been gradually mined, the remaining phosphate rock has a higher impurity level. If this higher impurity or low-grade phosphate rock is used for the production of ammonium and calcium phosphates, a conventional wet process may not produce the products that meet the specifications for ammonium and calcium phosphates.

In Reactions 6 and 7, although weak base ammonium hydroxide is used, most impurities in monobasic calcium phosphate will not be leached to the solution by ammonium hydroxide; therefore most impurities in monobasic calcium phosphate should also be rejected from the produced ammonium phosphate solution after separation of the solids from the ammonium phosphate solution by filtration. Ammonium phosphate produced in this process will have high purity. The purity may meet the specifications for an industrial grade (or a technical grade) of ammonium phosphate.

In this process, the phosphate rock is attacked by the phosphoric acid to form a slurry of $Ca(H_2PO_4)_2$ (or a mixture of $Ca(H_2PO_4)_2$, $CaHPO_4$ and $H_3PO_4$). The formed monobasic calcium phosphate slurry is reacted with ammonia in the next reactor to produce mono-ammonium phosphate (MAP) and dibasic calcium phosphate. The yield of mono-ammonium phosphate in this reaction can be higher than 50%. However, as discussed above, the yield should be controlled at about 30-35%, otherwise there will not be enough phosphate going to the conventional wet-process reactor to produce phosphoric acid which is recycled to treat the phosphate rock (at least 67% of total phosphate in the system needs to be recycled). The produced ammonium phosphate stays in the solution while dibasic calcium phosphate plus most of the impurities stay in the solids.

After filtration to separate the solids, the ammonium phosphate solution is concentrated to crystallize high purity mono-ammonium phosphate. The mother liquor solution after separating the mono-ammonium phosphate crystals may be used to produce di-ammonium phosphate (DAP) by reacting with ammonia as shown in Reaction ZZ. High purity dibasic calcium phosphate can also be made from the mother liquor solution by reacting with lime (Reaction 12). The released ammonium hydroxide from this reaction can be recycled to Reactions 6 and 7.

$$NH_4H_2PO_4 + NH_3 \rightarrow (NH_4)_2HPO4 \qquad ZZ$$

The dibasic calcium phosphate and solid impurities separated from the mono-ammonium phosphate solution go to the conventional wet-process reactor to react with sulfuric acid to produce phosphoric acid and gypsum (Reaction Z). The phosphoric acid solution is separated from the gypsum solid by filtration and recycled to the attacking tank to react with the phosphate rock (Reaction 1a).

Instead of ammonium phosphate, sodium or potassium phosphate can be produced using sodium carbonate, bicarbonate or hydroxide (or potassium carbonate, bicarbonate or hydroxide) to react with monobasic calcium phosphate. The reactions of sodium carbonate and sodium bicarbonate with monobasic calcium phosphate are shown respectively in Reactions 8 and 9.

$$Ca(H_2PO_4)_2 + Na_2CO_3 \rightarrow 2NaH_2PO_4 + CaCO_3\downarrow \qquad (8)$$

$$Ca(H_2PO_4)_2 + 2\,NaHCO_3 \rightarrow 2NaH_2PO_4 + CaCO_3\downarrow + CO_2\uparrow + H_2O \qquad (9)$$

It is clear that carbonates (Reaction 8) are a better choice as reagents than bicarbonates (Reaction 9) because twice as much bicarbonate is required to produce the same amount of sodium phosphate.

Di-sodium phosphate may be formed as shown in Reaction 10.

$$Ca(H_2PO_4)_2 + 2Na_2CO_3 \rightarrow 2Na_2HPO_4 + CaCO_3\downarrow + CO_2\uparrow H_2O \qquad (10)$$

Di-sodium phosphate may also be produced directly from dibasic calcium phosphate, $CaHPO4$, as shown in Reaction 11.

$$CaHPO_4 + Na_2CO_3 \rightarrow Na_2HPO_4 + CaCO_3\downarrow \qquad (11)$$

A tech grade or industrial grade of calcium phosphate can be prepared by reacting ammonium phosphate produced in Reactions 2, 4, 6 and 7 with calcium hydroxide (or lime) as shown in Reaction 12. A mother liquor solution of ammonium phosphate remains after crystallizing ammonium phosphate. This mother liquor solution can be used to make calcium phosphate with Reaction 12. Ammonium hydroxide produced in Reaction 12 can be recycled to produce ammonium phosphate (Reactions 6 and 7).

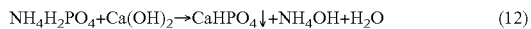
$$NH_4H_2PO_4 + Ca(OH)_2 \rightarrow CaHPO_4\downarrow + NH_4OH + H_2O \quad (12)$$

High purity calcium phosphate can alternatively be produced by using sodium phosphate produced in Reaction 8 (or the mother liquor solution produced in Reaction 8). Sodium hydroxide produced in Reaction (13) can also be recycled to produce sodium phosphate by reacting with monobasic calcium phosphate slurry.

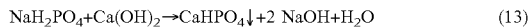
$$NaH_2PO_4 + Ca(OH)_2 \rightarrow CaHPO_4\downarrow + 2\,NaOH + H_2O \quad (13)$$

EXAMPLES

High purity ammonium phosphate solution was obtained by reacting a slurry of GTSP (Granular Triple Super Phosphate made from phosphate rock with wet-process phosphoric acid, mainly mono-calcium phosphate) with ammonium hydroxide or ammonia. The fluorine level in the ammonium phosphate solution was reduced to about 100 ppm and the levels of Mg, Al and Fe were reduced to a single digit ppm.

The yield of ammonium phosphate from the GTSP slurry reached up to about 68%, not far from a theoretical yield of 80-85% estimated based on the availability of $P_2O_5$ in GTSP to form ammonium phosphate.

Ammonium carbonate can also be used to react with GTSP slurry to make ammonium phosphate which has the purity as good as one obtained from ammonia or ammonium hydroxide.

Ammonium sulfate can potentially increase the yield of ammonium phosphate from GTSP slurry, but with higher fluorine and sulfate in the ammonium phosphate solution. These impurities can be reduced by an extra step of reacting with lime.

Separation of the ammonium phosphate solution from the produced precipitates by filtration was fast, smooth and easy to operate. The filtration can be finished in 5 to 10 minutes.

The experiments were conducted in a flask equipped with a mechanical stirring at ambient temperature (about 25° C.). GTSP (Granular Triple Super Phosphate made from phosphate rock with wet-process phosphoric acid, mainly mono-calcium phosphate) having about a content of 46% $P_2O_5$ was used in the experiments. Ammonium carbonate (39% with a pH about 9) used in the experiments was made on site by reacting an ammonia water solution (or ammonium hydroxide, reagent grade) with $CO_2$ generated from a reaction of sodium bicarbonate with sulfuric acid. Ammonium sulfate was prepared from ammonium carbonate (39%) and gypsum (70-80% dryness). $P_2O_5$, CaO (>5%) and ammonia were analyzed by spectrophotometric meter. CaO (<5%), SO4, Fe, Al and Mg were analyzed by an Inductively Coupled Plasma method. Fluorine was analyzed using an ion specific electrode.

Experiment 1. 96 g of water and 50 g of ammonium carbonate (39%) were added in a 500 ml flask with a mechanical mixer, then 54 g of GTSP (use as it is, non-grinded) was added in the flask. A lot of $CO_2$ bubbled from the solution. The mixing lasted for 2 hours. The solution was separated from solids by filtration with filtration paper (#2 or 5) under reduced pressure. The filtration took about 5 minutes. A total 136 g of solution and 55 g of wet solids were obtained. By looking at the solids on the filtration paper, it was observed that the solution contained a lot of unbroken (or granular shape) GTSP. This indicates that GTSP needs to be grinded prior to use for the experiment.

Experiment 2. 96 g of water and 50 g of ammonium carbonate (39%) were added in a 500 ml flask with a mechanical mixer. Then, 54 g of GTSP (ground by a coffee bean grinder) was added in the flask. A lot of $CO_2$ bubbled from the solution. After 30 minutes of mixing, another 10 g of ammonium carbonate solution (39%) was added to the flask. The total mixing time was 2 hours. Solids were separated from solution by filtration with filtration paper (#2 or 5) under reduced pressure, and then washing with water 2-3 times. The filtration and water washing took about 5-10 minutes. A total of 193 g of solution and 57 g of wet solids were obtained. The solution was analyzed to have a $P_2O_5$ content of 6.66%; an $NH_3$ content of 3.06%; an F content of 250 ppm; a Ca content of 140 ppm; a Mg content of 9 ppm; a Fe content of 15 ppm; an Al content of 10 ppm and a $SO_4$ content of 0.155%. The yield of ammonium phosphate from mono-calcium phosphate in GTSP was 51.7%.

Experiment 3. 96 g of water and 54 g of GTSP (grinded) were added to a 500 ml flask with a mechanical mixer. Then, 50 g of ammonium carbonate (39%) was added gradually to the flask over 30 minutes, while mixing. A lot of $CO_2$ bubbled from the solution during the addition of ammonium carbonate. The total mixing time was 2 hours. Solids were separated from solution by filtration with filtration paper (#2 or 5) under reduced pressure, and then washing with water 2-3 times. The filtration and water washing took about 5-10 minutes. A total 226 g of solution and 67 g of wet solids were obtained. The solution had a $P_2O_5$ content of 4.82%; an $NH_3$ content of 2.53%; an F content of 270 ppm; a Ca content of 110 ppm; an Mg content of 6 ppm; a Fe content of 9 ppm; an Al content of 11 ppm and a $SO_4$ content of 0.311%. A yield of 43.9% ammonium phosphate from mono-calcium phosphate in GTSP was obtained.

Experiment 4 (Repeat of Experiment 3). 96 g of water and 54 g of GTSP (grinded) were added in a 500 ml flask with a mechanical mixer, then, 50 g of ammonium carbonate (39%) was added gradually in 30 minutes into the flask while mixing. Lots of $CO_2$ were bubbling from the solution during addition of ammonium carbonate. The bubbling was stopped when about 90% ammonium carbonate was added in about 25 minutes. The total mixing time was 2 hours. Solids was separated from solution by filtration with filtration paper (#2 or 5) under reduced pressure, then, washed with water 2-3 times. The filtration and water washing took about 5-10 minutes. 216 g of solution and 65 g of wet solid were obtained. The solution had a $P_2O_5$ content of 5.44%; $NH_3$ content of 2.67%; F content of 249 ppm; Ca content of 197 ppm; Mg content of 12 ppm; a Fe content of 15 ppm; an Al content of 13 ppm and $SO_4$ content of 0.074%. A yield of 45.1% ammonium phosphate from mono-calcium phosphate in GTSP was obtained.

Experiment 5. 96 g of water and 50 g of ammonium carbonate (39%) were added in a 500 ml flask with a mechanical mixer. Then, 54 g of GTSP (grinded) was added gradually in 30 minutes into the flask while mixing to maintain solution pH at high, so that ammonium carbonate will not be decomposed to $CO_2$ and ammonia. The total mixing time was 2 hours. Solids were separated from solution by filtration with filtration paper (#2 or 5) under reduced pressure, then, washed with water 2-3 times. The filtration and water washing took about 5-10 minutes Total 217 g of solution and 58 g of wet solid were obtained. The solution contained a $P_2O_5$ content of 6.20%; an $NH_3$ content of 2.87%; a F content of 270 ppm; a Ca content of 222 ppm; a Mg content of 11 ppm; a Fe content of 3 ppm; an Al content of 8 ppm and $SO_4$ content of 0.137%. A yield of 54.2% ammonium phosphate from mono-calcium phosphate in GTSP was obtained.

Experiment 6. 400 g of water and 216 g of GTSP (grinded) were added in a 500 ml flask with a mechanical mixer. Then, 175 g of ammonium carbonate (39%) was added gradually in 30 minutes into the flask while mixing to maintain solution pH at high, so that ammonium carbonate will not be decomposed to $CO_2$ and ammonia. The total mixing time was 2 hours. Solids were separated from solution by filtration with filtration paper (#2 or 5) under reduced pressure, then, washed with water 2-3 times. The filtration and water washing took about 5-10 minutes. Total 520 g of solution and 275 g of wet solid were obtained. The solution contained a $P_2O_5$ content of 7.07%; an $NH_3$ content of 2.97%; a F content of 314 ppm; a Ca content of 136 ppm; a Mg content of 14 ppm; a Fe content of 4 ppm; an Al content of 15 ppm and a $SO_4$ content of 0.199%. A yield of 37.0% ammonium phosphate from mono-calcium phosphate in GTSP was obtained.

Experiment 7. 150 g of water and 72 g of GTSP (grinded) were added in a 500 ml flask with a mechanical mixer. Then, 17 ml (about 15.5 g) ammonium hydroxide (29.6% assay) was added gradually in 40 minutes into the flask while mixing. The total mixing time was 2 hours. The final solution had pH=3.5. Solids were separated from solution by filtration with filtration paper (#2 or 5) under reduced pressure, then, washed with water 2-3 times. The filtration and water washing took about 5-10 minutes. Total 189 g of solution and 101 g of wet solid were obtained. The solution had a $P_2O_5$ content of 7.41%; an $NH_3$ content of 1.25%; a F content of 105 ppm; a Ca content of 4470 ppm; an Mg content of 359 ppm; a Fe content of 30 ppm; an Al content of 26 ppm and a $SO_4$ content of 0.561%. A yield of 42.3% ammonium phosphate from mono-calcium phosphate in GTSP was obtained.

Experiment 8. 150 g of water and 72 g of GTSP (grinded) were added in a 500 ml flask with a mechanical mixer. Then, 25.8 g of ammonium hydroxide (29.6% assay) was added gradually in 40 minutes into the flask while mixing. The total mixing time was 2 hours. The final solution had pH=5.8. Solids were separated from solution by filtration with filtration paper (#2 or 5) under reduced pressure, then, washed with water 2-3 times. The filtration and water washing took about 5-10 minutes. Total 220 g of solution and 97 g of wet solid were obtained. The solution had a $P_2O_5$ content of 6.80%; an $NH_3$ content of 1.82%; a F content of 125 ppm; a Ca content of 189 ppm; a Mg content of 180 ppm; a Fe content of 16 ppm; an Al content of 8 ppm and a $SO_4$ content of 0.353%. A yield of 67.7% ammonium phosphate from mono-calcium phosphate in GTSP was obtained.

Experiment 9. 30 g of water, 3.60 g of dry gypsum (from Riverview plant) and 20 g of GTSP (grinded) were added in a 200 ml flask with a magnetic stirring bar for mixing. Then, 5.98 g of ammonium hydroxide (29.6% assay) was added gradually in about 30 minutes into the flask while mixing. The total mixing time was 1 hour 40 minutes. Solids were separated from solution by filtration with filtration paper (#2 or 5) under reduced pressure, then, washed with water 2-3 times. The filtration and water washing took about 5 minutes. Total 79 g of solution and 39 g of wet solid were obtained. The solution had a $P_2O_5$ content of 6.37%; an $NH_3$ content of 0.64%; a F content of 75 ppm; a Ca content of 5094 ppm; a Mg content of 180 ppm; a Fe content of 41 ppm; an Al content of 36 ppm and a $SO_4$ content of 0.306%. A yield of 54.6% ammonium phosphate from mono-calcium phosphate in GTSP was obtained.

Experiment 10. 96 g of water and 70 g of ammonium carbonate (39%) were added in a 500 ml flask with a mechanical mixer. Then, 54 g of GTSP (grinded) was added gradually in 30 minutes into the flask while mixing to maintain solution pH at high, so that ammonium carbonate will not be decomposed to $CO_2$ and ammonia. At the same time, an extra $CO_2$ was bubbling into the slurry while GTSP was added. The total mixing time was 2 hours. The final solution had pH=7.8. Solids were separated from solution by filtration with filtration paper (#2 or 5) under reduced pressure, then, washed with water 2-3 times. The filtration and water washing took about 5-10 minutes. Total 239 g of solution and 70 g of wet solid were obtained. The solution had a $P_2O_5$ content of 5.56%; an $NH_3$ content of 3.19%; a F content of 248 ppm; a Ca content of 196 ppm; a Mg content of 13 ppm; a Fe content of 8 ppm; an Al content of 10 ppm and a $SO_4$ content of 0.417%. A yield of 53.4% ammonium phosphate from mono-calcium phosphate in GTSP was obtained.

Experiment 11. 260 g of gypsum (70-80% dryness) produced in Riverview plant and 50 g of water were added in a 1000 ml Erlenmeyer flask with a magnetic stirring bar. 268 g of ammonium carbonate (39%) was added in the flask. The slurry was mixed for 1 hour and 50 minutes. Solids were separated from solution by filtration with filtration paper (#2 or 5) under reduced pressure. The filtration took about 5-10 minutes. A total of 348 g solution and 255 g of wet solid were obtained. The solution was analyzed to have a concentration of 23% ammonium sulfate (a theoretical yield is 36% based on a 100% conversion from calcium sulfate to ammonium sulfate and amount of gypsum added, $CaSO_4 2H_2O + (NH_4)_2CO_3 \rightarrow (NH_4)_2SO_4 + CaCO_3 + 2H_2O$).

Experiment 12. 300 g of slurry taken directly from Riverview plant reactor compartment 2 (the compartment prior to sulfuric acid addition) was added in a 500 ml flask with a mechanical mixer. Then, 78.6 g of ammonium hydroxide (29.6% assay) was added gradually in about 50 minutes into the flask while mixing. The total mixing time was 1 hour. The final slurry had pH=4.50. We attempted to separate the solution from solid form by filtration with filtration paper (#2 or 5) under reduced pressure, but it was not success. After about 1 hour filtration, only about 10 ml clean solution was obtained. The filtration of the whole slurry was then aborted. The obtained solution was analyzed for $P_2O_5$, CaO (>5%) and ammonia by spectrophotometric meter and CaO (<5%), $SO_4$, Fe, Al and Mg by ICP. The solution had a $P_2O_5$ content of 15.73%; an $NH_3$ content of 4.84%; a F content of 291 ppm; a Ca content of 2745 ppm; a Mg content of 262 ppm; a Fe content of 134 ppm; an Al content of 28 ppm and a $SO_4$ content of 6.168%. A yield of 79.7% ammonium phosphate from the slurry was obtained.

Experiment 14. 92 g of water and 54 g of GTSP (grinded) were added in a 500 ml flask with a mechanical mixer. Then, 42 g of ammonium sulfate (23%) was obtained from Experiment 11 and added gradually in 20 minutes into the flask while mixing. The total mixing time was 2 hours. The final slurry had pH=2.94. Solids were separated from solution by filtration with filtration paper (#2 or 5) under reduced pressure, then, washed with water 2-3 times. The filtration and water washing took about 5-10 minutes. Total 115 g of solution and 90 g of wet solid were obtained. The solution contained a $P_2O_5$ content of 10.68%; an $NH_3$ content of 1.87%; a F content of 461 ppm; a Ca content of 5565 ppm; a Mg content of 315 ppm; a Fe content of 96 ppm; an Al content of 57 ppm and a $SO_4$ content of 0.940%. A yield of 49.4% ammonium phosphate from mono-calcium phosphate in GTSP was obtained.

Experiment 15. 27 g of water and 10 g of GTSP (grinded) were added in a 500 ml flask with a mechanical mixer. Then, 3.61 g of ammonium sulfate (pure reagent grade) in 5 g water was added gradually in 20 minutes into the flask while mixing. The total mixing time was 2 hours. The final slurry had pH=2.90. Solids were separated from solution by filtration with filtration paper (#2 or 5) under reduced pressure, then, washed with water 2-3 times. The filtration and water washing took about 5 minutes. Total 30 g of solution and 20 g of wet solid were obtained. The solution contained a $P_2O_5$ content of 8.89%; an $NH_3$ content of 1.94%; a F content of 1080 ppm; a Ca content of 2669 ppm; a Mg content of 257 ppm; a Fe content of 96 ppm; an Al content of 136 ppm and a $SO_4$ content of 1.504%. A yield of 58.0% ammonium phosphate from mono-calcium phosphate in GTSP was obtained.

The results from all the above experiments are summarized in the table below.

| Exp # | Yield % | $P_2O_5$ % | $NH_3$ % | F ppm | Ca ppm | Mg ppm | Fe ppm | Al ppm | $SO_4$ % |
|---|---|---|---|---|---|---|---|---|---|
| 2 | 51.7 | 6.66 | 3.06 | 250 | 140 | 9 | 15 | 10 | 0.155 |
| 3 | 43.9 | 4.82 | 2.53 | 270 | 110 | 6 | 9 | 11 | 0.311 |
| 4 | 45.1 | 5.44 | 2.67 | 249 | 197 | 12 | 15 | 13 | 0.074 |
| 5 | 54.2 | 6.20 | 2.87 | 270 | 222 | 11 | 3 | 8 | 0.137 |
| 6 | 37.0 | 7.07 | 2.97 | 314 | 136 | 14 | 4 | 15 | 0.199 |
| 7 | 42.3 | 7.41 | 1.25 | 105 | 4470 | 359 | 30 | 26 | 0.561 |
| 8 | 67.7 | 6.80 | 1.82 | 125 | 189 | 186 | 16 | 8 | 0.353 |
| 9 | 54.6 | 6.37 | 0.64 | 75 | 5094 | 180 | 41 | 36 | 0.306 |
| 10 | 53.4 | 5.56 | 3.19 | 248 | 196 | 13 | 8 | 10 | 0.417 |
| 12 | 79.7 | 15.73 | 4.84 | 291 | 2745 | 262 | 134 | 28 | 6.168 |
| 14 | 49.4 | 10.68 | 1.87 | 461 | 5565 | 315 | 96 | 57 | 0.940 |
| 15 | 58.0 | 8.89 | 1.94 | 1080 | 2669 | 257 | 96 | 136 | 1.504 |

From the results shown in the Table 2, it can be seen that the experiment 8 produced the best results for both yield and purity of ammonium phosphate. About 68% yield was obtained based on the total $P_2O_5$ in GTSP. All impurity levels were low, especially for F, Al, and Fe. The impurity levels in the ammonium phosphate solutions generated in all other experiments were also low (except for F level in Experiment 15 because of a low final solution pH which allowed some F to exit as HF in the solution).

Experiment 9 was conducted in the presence of a large amount of gypsum to produce ammonium phosphate from GTSP slurry. The presence of a large amount of gypsum appeared to have little effect on the purity of ammonium phosphate. In fact, the sulfate level of Experiment 9 was low. The experimental results indicate that the sulfate level in the ammonium phosphate solution was not increased and superphosphate (a mixture of mono-calcium phosphate with gypsum) may also be used to produce high purity ammonium phosphate.

The separations of the solutions from the solids by filtrations in the all experiments using GTSP have no problems. All filtrations ran fast and smoothly. When the slurry (mainly phosphoric acid and gypsum) taken from the plant reactor compartment 2 was used to produce ammonium phosphate, the filtration of the ammonium phosphate solution from the precipitates was so slow that only about 10 ml solution was passed though the filter in about 1 hour. This confirms that if the wet-process phosphoric acid is used to make high purity ammonium phosphate, the filtration of the solution from the solids will be problem.

The new process has several potential advantages comparing to the conventional wet-process. These advantages may or may not be present. First, mono-ammonium phosphate produced from the new process has much higher purity than that produced from the wet-process phosphoric acid with ammonia. This has been demonstrated by experiments. For example, for mono-ammonium phosphate produced according to the above process, F and Mg were measured at 10-100 ppm, Fe and Al at 3-20 ppm and $SO_4$ at about 0.07-0.4% in the ammonium phosphate solution before forming ammonium phosphate crystals by crystallization, while ammonium phosphate produced from the wet-process acid has F at 1.5-2.1%, Mg, Fe and Al at 0.05-0.5% and $SO_4$ at 1.5-2.1%. Because of the low fluorine level in the ammonium phosphate solution produced according to the process described above, there will be no fluorine volatility issue in the off-gas stream when the solution is concentrated by heating.

Second, the filtration to separate the ammonium phosphate solution from the dibasic calcium phosphate and impurity solids may be faster and easier to operate.

Third, the process proposed above may allow low-grade phosphate rock to be used to make high purity products. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for producing high purity ammonium phosphate comprising:
   reacting phosphate rock with phosphoric acid to produce monobasic calcium phosphate; and
   reacting the monobasic calcium phosphate with ammonium carbonate to produce ammonium phosphate.

2. The method according to claim 1, wherein
   dibasic calcium phosphate is produced as a by-product when reacting monobasic calcium phosphate with ammonium carbonate,
   the dibasic calcium phosphate is reacted with sulfuric acid to produce phosphoric acid, and
   the phosphoric acid is used in reacting the phosphate rock with phosphoric acid.

3. The method according to claim 1, wherein
   impure calcium phosphate is produced by reacting the phosphate rock with phosphoric acid, and
   the produced ammonium phosphate is reacted with calcium hydroxide to produce purified calcium phosphate.

4. The method according to claim 3, wherein
   the reaction with calcium hydroxide produces purified calcium phosphate and ammonium hydroxide, and
   the ammonium hydroxide is reacted with impure calcium phosphate to produce ammonium phosphate.

5. A method for producing high purity sodium phosphate comprising:
   reacting phosphate rock with phosphoric acid to produce monobasic calcium phosphate; and
   reacting the monobasic calcium phosphate with sodium carbonate to produce sodium phosphate.

6. The method according to claim 5, wherein
dibasic calcium phosphate is produced as a by-product when reacting monobasic calcium phosphate with sodium carbonate,
the dibasic calcium phosphate is reacted with sulfuric acid to produce phosphoric acid, and
the phosphoric acid is used in reacting phosphate rock with phosphoric acid.

7. The method according to claim 5, wherein
impure calcium phosphate is produced by reacting the phosphate rock with phosphoric acid, and
the produced sodium phosphate is reacted with calcium hydroxide to produce purified calcium phosphate.

8. The method according to claim 7, wherein
the reaction with calcium hydroxide produces purified calcium phosphate and sodium hydroxide, and
the sodium hydroxide is reacted with impure calcium phosphate to produce sodium phosphate.

9. A method for producing high purity potassium phosphate comprising:
reacting phosphate rock with phosphoric acid to produce monobasic calcium phosphate; and
reacting the monobasic calcium phosphate with potassium carbonate to produce potassium phosphate.

10. The method according to claim 9, wherein
dibasic calcium phosphate is produced as a by-product when reacting monobasic calcium phosphate with potassium carbonate,
the dibasic calcium phosphate is reacted with sulfuric acid to produce phosphoric acid, and
the phosphoric acid is used in reacting phosphate rock with phosphoric acid.

11. The method according to claim 9, wherein
impure calcium phosphate is produced by reacting the phosphate rock with phosphoric acid, and
the produced potassium phosphate is reacted with calcium hydroxide to produce purified calcium phosphate.

12. The method according to claim 11, wherein
the reaction with calcium hydroxide produces purified calcium phosphate and potassium hydroxide, and
the potassium hydroxide is reacted with impure calcium phosphate to produce potassium phosphate.

13. A method for producing high purity ammonium phosphate comprising:
reacting phosphate rock with phosphoric acid to produce monobasic calcium phosphate; and
reacting the monobasic calcium phosphate with ammonium hydroxide to produce ammonium phosphate and dibasic calcium phosphate as a by-product;
reacting the dibasic calcium phosphate with sulfuric acid to produce phosphoric acid;
recycling the phosphoric acid to react with the phosphate rock;
reacting a portion of the ammonium phosphate with calcium hydroxide to produce purified calcium phosphate and ammonium hydroxide; and
recycling the ammonium hydroxide to react with the monobasic calcium phosphate and produce ammonium phosphate.

* * * * *